United States Patent Office

3,427,320
Patented Feb. 11, 1969

3,427,320
PERFLUORO(ALKYL SUBSTITUTED IMIDAZO-LINES) AND PROCESS FOR MAKING
Paul H. Ogden, Oakdale Township, Washington County, Minn., assignor to Minnesota Mining and Manufacturing Company, St. Paul, Minn., a corporation of Delaware
No Drawing. Filed Apr. 3, 1967, Ser. No. 627,678
U.S. Cl. 260—309.6
Int. Cl. C07d *49/34;* C07c *121/02;* C08g *51/44*
5 Claims

ABSTRACT OF THE DISCLOSURE

Perfluoro (1-methyl-4,5 polyalkyl-3-imidazolines) and process for making same by isomerization of perfluoro-(3,4 - dialkylsubstituted - 2,5 - diazahexa - 1,5 - dienes) or perfluoro - (3,3,4 - trialkylsubstituted - 2,5 - diazahexa-1,5-dienes) using ionic fluoride. The perfluoro (1-ethyl-4,5 polyalkyl-3-imidazolines) may be hydrolyzed by water to perfluoro(N-cyano-β-gem diols) which are useful as solvents for polymers.

BACKGROUND

Although alkyl substituted 3-imidazolines are known and possess various uses, such as antifoaming agents (Valko and Kamlet, U.S. 2,635,079), corrosion prevention agents (Raifsnider U.S. 2,915,528), and photosensitizers (Duffin and Kendall, Industrial Chim. Belge. 20, Spec. No. 599 (1955)), so far as is known to me, no one has heretofore prepared perfluoro(alkyl substituted imidazolines).

SUMMARY

The novel process and products of the present invention are summarized by the following generic equation:

(1)

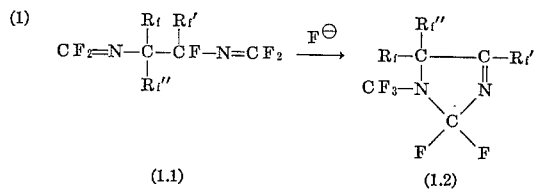

(1.1)            (1.2)

where $R_f$ and $R_f'$ are each a perfluoroalkyl group containing from 1 through 10 or more carbon atoms, and $R_f''$ is selected from the group consisting of fluorine and a perfluoroalkyl radical containing from 1 through 10 or more carbon atoms.

The compounds of Formula 1.1 can be prepared as described in my copending U.S. Patent application S.N. 562,540, filed July 5, 1966.

A preferred compound of Formula 1.2 is that where $R_f$ is fluorine and $R_f'$ and $R_f''$ are each trifluoromethyl.

As indicated by Equation 1, the compounds of Formula 1.1 are isomerized to the compounds of Formula 1.2 by contacting the Formula 1.1 compounds with ionic fluoride.

The ionic fluoride may be supplied by adding a suitable source of ionic fluoride, preferably cesium fluoride. The desired imidazole products of Formula 1.2 are then formed as a result of isomerization induced by ionic fluoride.

The isomerization reaction requires a condensed phase, that is, either a solid ionic fluoride phase with the azomethine present as vapor or liquid, or as a homogeneous liquid phase containing fluoride ion in solution. The term "ionic fluoride" therefore includes both solid salt-like structures and free fluoride ion. Compounds in which the fluorine appears as a stable complex, e.g., ferric fluoride, are generally not suitable. Compounds which readily produce fluoride ion upon hydrolysis by adventitious moisture, such as $SiF_4$, can be used as catalysts, but the resulting low fluoride ion concentration results in slow and incomplete isomerization. The preferred isomerization catalysts are the alkali metal fluorides, particularly cesium fluoride. The total amount of fluoride present is not controlling; the rate depends upon the amount of surface available where a solid phase is present. In the case of the homogeneous reaction, the rate is apparently proportional to the concentration of fluoride ion in the liquid phase.

The azomethine may be present as the liquid or vapor phase or may be in solution, preferably in an inert solvent, e.g., a solvent which does not itself react with the azomethine under the conditions of the reaction. Such solvents are free of active Zerewitinoff hydrogen and dissolve, under the reaction conditions, at least 1% by weight of the azomethine; such solvents include the halocarbons e.g., $CFCl_3$, $CF_2HCl$, oxygenated organic compounds such as acetone, ethyl acetate, and the like.

The "isomerization" described above involves the net shift of a fluorine atom from one nitrogen-attached carbon atom to another nitrogen-attached carbon atom and is a necessary step in the formation of the cyclized product from the azomethine starting material. Isomerization can lead either to linear trifluoromethyl terminated diazadienes or to the cyclic imidazoline, depending upon the structure of the azomethine. In general, in those compounds in which the dimethylene carbons joining the two nitrogen atoms of the azomethine include at least one $CF_2$ group, the linear product predominates. The presence of at least one perfluoroalkyl group on each methylene carbon is necessary to form substantial amounts of the cyclized product. In general, the presence of three perfluoroalkyl groups rather than two, and the increase in size of the perfluoroalkyl groups favors a relatively larger fraction of ring formation.

The reaction is preferably carried out at room temperature, but it will proceed within a temperature range of about 0° C. to 150° C. The reaction rate is dependent upon ionic fluoride concentration and temperature.

Usually conversion from the perfluoro-α,ω-bis-azomethine is complete in the presence of cesium fluoride. However, separation of products can be conveniently achieved by vapor phase chromatography or distillation if desired.

The compounds of Formula 1.2 are useful as chemical intermediates; thus they can be hydrolyzed by water to produce perfluoro(N-cyano-β-ketones) characterized by Formula 2.1 or perfluoro(N-cyano-β-gem diols) characterized by Formula 2.2 as shown by the following equation:

(2)

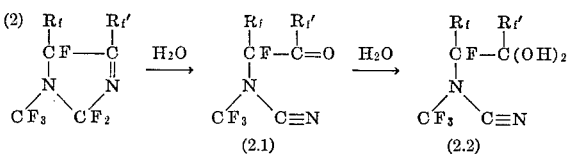

(2.1)                     (2.2)

where $R_f$ and $R_f'$ are as defined above. Compounds of Formula 2.2 are useful as solvents for polymers, such as polyamides, e.g., polycaprolactam, and polyalcohols, e.g., polyvinyl alcohol.

EXAMPLES

The following examples more particularly illustrate the products of the invention and the process for their preparation.

Example 1
ISOMERIZATION OF PERFLUORO(3,4-DIMETHYL-2,5-DIAZAHEXA-1,5-DIENE

Perfluoro(3,4 - dimethyl - 2,5 - diazahexa - 1,5 - diene), $CF_2=N-CF(CF_3)-CF(CF_3)-N=CF_2$ (1.0 g., 3 mmoles) and chlorotrifluoromethane (2.0 ml.), are condensed under vacuum into a glass ampoule which contains dry cesium fluoride (0.1 g.). The ampoule is then sealed and allowed to warm to room temperature (24.5° C.) at which it is maintained for one hour.

The volatile products are then transferred to a high vacuum system and the individual components are isolated by fractional distillation-condensation and vapor phase chromatography. They are identified as chlorotrifluoromethane (2.0 ml.), perfluoro(3,4-dimethyl-2,5-diazahexa-2,4 - diene), $CF_3—N=C(CF_3)—C(CF_3)=N—CF_3$ (I) (0.6 g., 60% conversion of the bisazomethine) and perfluoro(1,4,5-trimethyl-3-imidazoline),

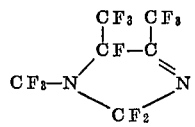

II (0.3 g., 30% conversion of the bisazomethine).

Compound I is identified by infrared, mass, and $F^{19}$ nuclear magnetic resonance spectra. Compound II is identified by its characteristic infrared, mass, $F^{19}$ nuclear magnetic resonance spectra, and molecular weight. Calcd. for $C_6F_{12}N_2$, 328. Found 323. Its $F^{19}$ n.m.r. spectrum shows three peaks of equal intensity corresponding to the trifluoromethyl groups, one peak of one third intensity corresponding to the CF group and an AB type pattern of two thirds intensity (J=166 c./sec.) corresponding to the $CF_2$ group.

Examples 2 and 3

When each of the following indicated starting materials is treated in a manner as described above in Example 1, the indicated products are produced:

| Ex. No. | Starting perfluoro compound of Formula 1.1 | Product imidazoline of Formula 1.2 |
|---|---|---|
| 2 | $CF_2=N-CF(C_8F_{17})-CF(CF_3)-N=CF_2$ | $\begin{matrix} C_8F_{17} & CF_3 \\ CF—C \\ N \quad N \\ CF_3 \quad CF_2 \end{matrix}$ |
| 3 | $CF_2=N-C(CF_3)_2-CF(CF_3)-N=CF_2$ | $\begin{matrix} CF_3 & CF_3 \\ CF_3—C———C \\ CF_3—N \quad N \\ CF_2 \end{matrix}$ |

Each of the products of Examples 1, 2, and 3, respectively, is hydrolyzed with distilled water.

I claim:

1. A compound of the formula

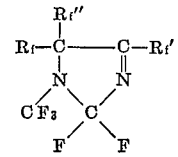

where $R_f$ and $R_f'$ are each perfluoroalkyl of from 1 through 10 carbon atoms, and $R_f''$ is selected from the group consisting of fluorine and perfluoroalkyl of from 1 through 10 carbon atoms.

2. Perfluoro(1,4,5-trimethyl-3-imidazoline).

3. A process for the preparation of a compound of claim 1 which comprises contacting perfluoro-(3,4-dialkyl-substituted-2,5-diazahexa-1,5-diene) or perfluoro-(3,3,4-trialkylsubstituted-2,5-diazahexa-1,5-diene) with a source of ionic fluoride.

4. The process of claim 3 wherein the source of ionic fluoride is cesium fluoride.

5. The process of claim 3 wherein said diazahexa-1,4-diene is perfluoro(3,4-dimethyl-2,5-diazahexa-1,5-diene).

References Cited

UNITED STATES PATENTS 2,915,528 12/1959 Raifsnider ———————— 260—309.6

OTHER REFERENCES

Asinger et al., Chem. Abstracts, vol. 55, columns 12391-2 (1961). QD1.A51.

HENRY R. JILES, Primary Examiner.

N. TROUSOF, Assistant Examiner.

U.S. Cl. X.R.

252—364; 260—551, 566